(12) United States Patent
Martin

(10) Patent No.: US 7,423,979 B2
(45) Date of Patent: *Sep. 9, 2008

(54) METHOD AND SYSTEM FOR DETERMINING NETWORK CHARACTERISTICS USING ROUTING PROTOCOLS

(75) Inventor: Daniel J. Martin, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

This patent is subject to a terminal disclaimer.

(21) Appl. No.: 10/672,303

(22) Filed: Sep. 26, 2003

(65) Prior Publication Data

US 2004/0233859 A1    Nov. 25, 2004

Related U.S. Application Data

(63) Continuation of application No. 09/861,167, filed on May 18, 2001, now Pat. No. 6,744,739.

(51) Int. Cl.
*H04L 12/28* (2006.01)
(52) U.S. Cl. .................................. 370/255; 370/401
(58) Field of Classification Search ................ 370/401, 370/402, 389, 254, 255, 248, 395.31, 411, 370/400
See application file for complete search history.

(56) References Cited

U.S. PATENT DOCUMENTS 3,855,456 A    12/1974 Summers et al.

(Continued)

FOREIGN PATENT DOCUMENTS

EP    0 209 795    1/1987

(Continued)

OTHER PUBLICATIONS

Subramanian, Mani, Network Management: Principles and Practice, Addison Wesley Longman, 2000.

(Continued)

*Primary Examiner*—Brenda Pham
(74) *Attorney, Agent, or Firm*—Seth H. Ostrow; Dreier LLP

(57) ABSTRACT

A method and system are described herein for obtaining IGP network information useful in determining network routing topologies. The method involves querying a router for its router identifier and all its area identifiers, counting the router's number of area identifiers to determine whether the router is an ABR or an ASBR, and querying the router's link state database for the lowest area identifier on the router. The method further involves importing all Type 1 and Type 2 LSAs for that area into the database of a network discovery software engine, importing from the router's link state database only those networks outside the router's autonomous system that are also directly connected to an ASBR, then moving to the next highest area identifier in the router's database to repeat importing Type 1 and Type 2 LSAs for that area into the database. Next, the method involves importing from the router's link state database only those networks outside the router's autonomous system that are also directly connected to an ASBR. This process is repeated until there are no more areas on the router that have not been processed. Then, starting with the lowest area-identifier discovered, all networks in the area making LSAs other than Type 1 or Type 2 are swept. The entire process is repeated for every router discovered.

15 Claims, 15 Drawing Sheets

U.S. PATENT DOCUMENTS

| | | | |
|---|---|---|---|
| 3,906,454 A | 9/1975 | Martin | |
| 4,135,662 A | 1/1979 | Dlugos | |
| 4,410,950 A | 10/1983 | Toyoda et al. | |
| 4,438,494 A | 3/1984 | Budde et al. | |
| 4,503,534 A | 3/1985 | Budde et al. | |
| 4,503,535 A | 3/1985 | Budde et al. | |
| 4,517,468 A | 5/1985 | Kemper et al. | |
| 4,545,013 A | 10/1985 | Lyon et al. | |
| 4,568,909 A | 2/1986 | Whynacht | |
| 4,585,975 A | 4/1986 | Wimmer | |
| 4,591,983 A | 5/1986 | Bennett et al. | |
| 4,622,545 A | 11/1986 | Atkinson | |
| 4,648,044 A | 3/1987 | Hardy et al. | |
| 4,727,545 A | 2/1988 | Glackemeyer et al. | |
| 4,817,092 A | 3/1989 | Denny | |
| 4,823,345 A | 4/1989 | Daniel et al. | |
| 4,866,712 A | 9/1989 | Chao | |
| 4,881,230 A | 11/1989 | Clark et al. | |
| 4,914,657 A | 4/1990 | Walter et al. | |
| 4,932,026 A | 6/1990 | Dev et al. | |
| 4,935,876 A | 6/1990 | Hanatsuka | |
| 5,107,497 A | 4/1992 | Lirov et al. | |
| 5,109,486 A | 4/1992 | Seymour | |
| 5,123,017 A | 6/1992 | Simpkins et al. | |
| 5,125,091 A | 6/1992 | Staas, Jr. et al. | |
| 5,133,075 A | 7/1992 | Risch | |
| 5,159,685 A | 10/1992 | Kung | |
| 5,179,556 A | 1/1993 | Turner | |
| 5,204,955 A | 4/1993 | Kagei et al. | |
| 5,214,653 A | 5/1993 | Elliott, Jr. et al. | |
| 5,247,517 A | 9/1993 | Rose et al. | |
| 5,261,044 A | 11/1993 | Dev et al. | |
| 5,293,629 A | 3/1994 | Conley et al. | |
| 5,295,244 A | 3/1994 | Dev et al. | |
| 5,309,448 A | 5/1994 | Bouloutas et al. | |
| 5,321,837 A | 6/1994 | Daniel et al. | |
| 5,375,070 A | 12/1994 | Hershey et al. | |
| 5,432,934 A | 7/1995 | Levin et al. | |
| 5,436,909 A | 7/1995 | Dev et al. | |
| 5,483,637 A | 1/1996 | Winokur et al. | |
| 5,485,455 A | 1/1996 | Dobbins et al. | |
| 5,491,694 A | 2/1996 | Oliver et al. | |
| 5,495,470 A | 2/1996 | Tyburski et al. | |
| 5,504,921 A | 4/1996 | Dev et al. | |
| 5,521,910 A | 5/1996 | Matthews | |
| 5,528,516 A | 6/1996 | Yemini et al. | |
| 5,559,955 A | 9/1996 | Dev et al. | |
| 5,590,120 A | 12/1996 | Vaishnavi et al. | |
| 5,627,819 A | 5/1997 | Dev et al. | |
| 5,649,103 A | 7/1997 | Datta et al. | |
| 5,666,481 A | 9/1997 | Lewis | |
| 5,675,741 A | 10/1997 | Aggarwal et al. | |
| 5,687,290 A | 11/1997 | Lewis | |
| 5,696,486 A | 12/1997 | Poliquin et al. | |
| 5,706,436 A | 1/1998 | Lewis et al. | |
| 5,722,427 A | 3/1998 | Wakil et al. | |
| 5,727,157 A | 3/1998 | Orr et al. | |
| 5,734,642 A | 3/1998 | Vaishnavi et al. | |
| 5,748,781 A | 5/1998 | Datta et al. | |
| 5,751,933 A | 5/1998 | Dev et al. | |
| 5,751,965 A | 5/1998 | Mayo et al. | |
| 5,754,532 A | 5/1998 | Dev et al. | |
| 5,764,955 A | 6/1998 | Doolan | |
| 5,768,501 A | 6/1998 | Lewis | |
| 5,777,549 A | 7/1998 | Arrowsmith et al. | |
| 5,790,546 A | 8/1998 | Dobbins et al. | |
| 5,791,694 A | 8/1998 | Fahl et al. | |
| 5,793,362 A | 8/1998 | Matthew et al. | |
| 5,812,750 A | 9/1998 | Dev et al. | |
| 5,822,305 A | 10/1998 | Vaishnavi et al. | |
| 5,832,503 A | 11/1998 | Malik et al. | |
| 5,872,928 A | 2/1999 | Lewis et al. | |
| 5,881,246 A | 3/1999 | Crawley et al. | |
| 5,889,953 A | 3/1999 | Thebaut et al. | |
| 5,907,696 A | 5/1999 | Stilwell et al. | |
| 5,940,376 A | 8/1999 | Yanacek et al. | |
| 5,970,984 A | 10/1999 | Wakil et al. | |
| 5,980,984 A | 11/1999 | Modera et al. | |
| 5,987,442 A | 11/1999 | Lewis et al. | |
| 5,995,503 A * | 11/1999 | Crawley et al. | 370/351 |
| 6,000,045 A | 12/1999 | Lewis | |
| 6,003,090 A | 12/1999 | Puranik et al. | |
| 6,014,697 A | 1/2000 | Lewis et al. | |
| 6,026,442 A | 2/2000 | Lewis et al. | |
| 6,041,383 A | 3/2000 | Jeffords et al. | |
| 6,049,828 A | 4/2000 | Dev et al. | |
| 6,057,757 A | 5/2000 | Arrowsmith et al. | |
| 6,064,304 A | 5/2000 | Arrowsmith et al. | |
| 6,064,986 A | 5/2000 | Edelman | |
| 6,064,996 A | 5/2000 | Yamaguchi et al. | |
| 6,084,858 A | 7/2000 | Matthews et al. | |
| 6,115,362 A | 9/2000 | Bosa et al. | |
| 6,131,112 A | 10/2000 | Lewis et al. | |
| 6,138,122 A | 10/2000 | Smith et al. | |
| 6,141,720 A | 10/2000 | Jeffords et al. | |
| 6,199,172 B1 | 3/2001 | Dube et al. | |
| 6,205,563 B1 | 3/2001 | Lewis | |
| 6,209,033 B1 | 3/2001 | Datta et al. | |
| 6,216,168 B1 | 4/2001 | Dev et al. | |
| 6,233,623 B1 | 5/2001 | Jeffords et al. | |
| 6,243,747 B1 | 6/2001 | Lewis et al. | |
| 6,252,856 B1 | 6/2001 | Zhang | |
| 6,255,943 B1 | 7/2001 | Lewis et al. | |
| 6,275,492 B1 | 8/2001 | Zhang | |
| 6,324,530 B1 | 11/2001 | Yamaguchi et al. | |
| 6,324,590 B1 | 11/2001 | Jeffords et al. | |
| 6,336,138 B1 | 1/2002 | Caswell et al. | |
| 6,349,306 B1 | 2/2002 | Malik et al. | |
| 6,373,383 B1 | 4/2002 | Arrowsmith et al. | |
| 6,374,293 B1 | 4/2002 | Dev et al. | |
| 6,381,639 B1 | 4/2002 | Thebaut et al. | |
| 6,392,667 B1 | 5/2002 | McKinnon et al. | |
| 6,418,476 B1 * | 7/2002 | Luciani | 709/238 |
| 6,421,719 B1 | 7/2002 | Lewis et al. | |
| 6,430,712 B2 | 8/2002 | Lewis | |
| 6,437,804 B1 | 8/2002 | Ibe et al. | |
| 6,502,079 B1 | 12/2002 | Ball et al. | |
| 6,510,478 B1 | 1/2003 | Jeffords et al. | |
| 6,603,396 B2 | 8/2003 | Lewis et al. | |
| 6,651,062 B2 | 11/2003 | Ghannam et al. | |
| 6,711,152 B1 * | 3/2004 | Kalmanek et al. | 370/351 |
| 6,744,739 B2 * | 6/2004 | Martin | 370/254 |
| 6,820,134 B1 * | 11/2004 | Zinin et al. | 709/238 |
| 6,850,524 B1 * | 2/2005 | Troxel et al. | 370/395.32 |
| 6,977,937 B1 * | 12/2005 | Weinstein et al. | 370/401 |
| 2001/0013107 A1 | 8/2001 | Lewis | |
| 2001/0042139 A1 | 11/2001 | Jeffords et al. | |
| 2001/0047409 A1 | 11/2001 | Datta et al. | |
| 2001/0047430 A1 | 11/2001 | Dev et al. | |
| 2001/0052085 A1 | 12/2001 | Dube et al. | |
| 2002/0032760 A1 | 3/2002 | Matthews et al. | |
| 2002/0050926 A1 | 5/2002 | Lewis et al. | |
| 2002/0075882 A1 | 6/2002 | Donis et al. | |
| 2002/0184528 A1 | 12/2002 | Shevenell et al. | |
| 2002/0188584 A1 | 12/2002 | Ghannam et al. | |
| 2003/0110396 A1 | 6/2003 | Lewis et al. | |

FOREIGN PATENT DOCUMENTS

| | | |
|---|---|---|
| EP | 0 319 998 B1 | 6/1989 |
| EP | 0 338 561 B1 | 10/1989 |
| EP | 0 342 547 B1 | 11/1989 |
| EP | 0 616 289 | 9/1994 |
| EP | 0 686 329 B1 | 12/1995 |

| | | |
|---|---|---|
| WO | WO 89/07377 | 8/1989 |
| WO | WO 93/00632 | 1/1993 |
| WO | WO 95/20297 | 7/1995 |
| WO | WO 96/09707 | 3/1996 |
| WO | WO 97/16906 | 5/1997 |
| WO | WO 97/29570 | 8/1997 |
| WO | WO 97/37477 | 10/1997 |
| WO | WO 97/44937 | 11/1997 |
| WO | WO 98/42109 | 9/1998 |
| WO | WO 98/44682 | 10/1998 |
| WO | WO 98/52322 | 11/1998 |
| WO | WO 99/27682 | 6/1999 |
| WO | WO 00/13112 | 3/2000 |
| WO | WO 00/72183 | 11/2000 |
| WO | WO 01/86380 | 11/2001 |
| WO | WO 01/86443 | 11/2001 |
| WO | WO 01/86444 | 11/2001 |
| WO | WO 01/86775 | 11/2001 |
| WO | WO 01/86844 | 11/2001 |
| WO | WO 02/06971 | 1/2002 |
| WO | WO 02/06972 | 1/2002 |
| WO | WO 02/06973 | 1/2002 |

OTHER PUBLICATIONS

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addison-Wesley, 1994.

RFC 1158—Management Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, Eds., May 1990, http://www.faqs.org/rfcs/rfc1156.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management Information Services—Structure of management information: Management Information Model.

ISO/IEC 9595:1998, Information technology—Open Systems Interconnection—Common management information service.

ISO/IEC 9596-2:1993, Information technology—Open Systems Interconnection—Common management information protocol: Protocol Implementation Conformance Statement (PICS) proforma.

ISO/IEC 7498-4:1989, Information processing systems—Open Systems Interconnection—Basic Reference Model—Part 4: Management framework.

Gilbert R., et al., CNMGRAF—Graphic Presentation Services for Network Management, ACM 0-89791-164 (1985).

M. Gargano, et al., A Logical Data Model for Integrated Geographical Databases, IEEE (1990).

Micromuse's Netcool/Omnibus, A Cool MOM Makes It Easy, Data Communications, Jan. 1995.

* cited by examiner

METHOD AND SYSTEM FOR DETERMINING NETWORK CHARACTERISTICS USING ROUTING PROTOCOLS

CROSS-REFERENCE TO RELATED APPLICTION

This application is a Continuation of U.S. application Ser. No. 09/861,167, filed May 18, 2001, now U.S. Pat. No. 6,744,739.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates to computer networks: More particularly, the invention relates to methods and systems for determining a routing topology of a computer network by obtaining and utilizing Interior Gateway Protocol (IGP) routing information or Exterior Gateway Protocol (EGP) routing information.

Computer networks are growing in complexity and criticality. For example, a large corporation may support a computer network with tens of thousands of individual computers and thousands of network routers, hubs, repeaters or other network connectivity hardware. These networks are in many cases vital to an organization's functioning, and in some cases are mission- or life-critical.

Because of increasing network size and complexity, service provider networks (such as Internet service providers or application service providers) in particular are quickly growing beyond the ability of current methods to manage them. For example, the typical level of modification and reconfiguration in a complex service provider network is at best difficult and time-consuming to understand or document.

Although several commercially and freely available software packages attempt to address network complexity problems, and some theoretical work has been done in this field, effective solutions to comprehensive network management problems in complex networks remain elusive or non-existent.

Increasingly, the problem in a large, complex network is not a change in the actual physical topology. There are known methods for solving the problem of single points of failure and link layer failures. For example, protection switching on the SONET layer of a network, as known to one skilled in the art, can address physical topology management issues such as single-points of failure or link layer failures among other things. The automatic protection switching (APS) feature is supported, for example, on Cisco 7500 series routers and Cisco 12000 series routers, which allow switchover of packet-over-SONET (POS) circuits in the event of circuit failure, and is often required when connecting SONET equipment to Telco equipment. Here, APS refers to the mechanism of using a "protect" POS interface in the SONET network as the backup for a "working" POS interface. When the working interface fails, the protect interface quickly assumes its traffic load.

The problem in many service provider networks is the topology change produced by the routing protocols. Routing protocols and routing policies are how service providers control traffic and manage traffic across their network and with other service provider networks. For example, a large service provider network may have a relatively stable configuration of computing nodes and interconnection hardware, which can dynamically load balance a variety of incoming network traffic primarily through packet traffic rerouting. Thus, when one node on the service provider network is overwhelmed by traffic, software methods can be used to reconfigure routers and compute nodes so that incoming traffic is redistributed and congestion is decreased or eliminated.

The existing efforts in this area are concerned with discovering physical networks and physical topologies, not routing topologies. However, physical topologies alone do not necessarily provide a complete and accurate representation of the topology of information flow in a network or networks, which is affected not only by the topology but also by routing considerations. For example, even though a router may be directly connected to a particular network or networks, traffic bound for that network or those networks may never cross that router. The actual flow of packets through the network or networks is controlled by the routing protocols via techniques known to those skilled in the art of network management, such as, for example, route summarization (where an internetwork is divided into logical areas, with each area's border router advertising only a single summary route to other areas in order to reduce routing table size), route filters (where an additional metric rates relative reliability of individual networks as a source from which to determine optimal routes), and related routing polices.

As a further example, physical topology alone does not take into account information flow within a network as affected by multiple routers being directly connected to a particular network. How the traffic bound for that network is distributed, if at all, across those routers is a result of specific settings in the routing protocols. Thus, by changing settings in the routing protocols, traffic distribution, and thus routing topology, is fundamentally altered.

In terms of the ISO/OSI network model, (described in Douglas Comer's two volume work entitled "Internetworking with TCP/IP," which is hereby incorporated by reference), previous work is focussed on understanding layer 2 and layer 3 topologies. The previous work does not analyze or take into account actual traffic flow.

While several commercial products for determining network topology are available, these products have serious drawbacks relating to their inability to take into account routing topology. For example, HP's Openview does not consider subnet masks. Other commercial products such as Riversoft's Openriver do not take into account routing protocols at all.

As recognized by the inventors, IGP information, such as may be obtained by IGP link state databases, may be particularly useful in determining routing topologies. However, the existing methods do not utilize IGP information in routing topology determination. Thus, there is a need in the art for a method of determining routing topology of a computer network, particularly in the context of complex networks, and for obtaining IGP information useful in determining routing topology of a computer network.

SUMMARY OF THE INVENTION

It is an object of the present invention to solve the problems described above associated with existing methods of determining network topologies.

It is still another object of the invention to provide a method for determining routing topologies in networks, including complex networks.

It is still another object of the invention to provide a method for determining routing topologies in networks, including complex networks, that takes into account actual packet routing traffic flows and routing topologies.

In one embodiment, the invention provides a method and system for determining routing topology in a computer network, and comprises obtaining IGP information, obtaining EGP information, and utilizing the IGP and EGP information to determine network topologies.

In another embodiment, the invention provides a method and system for determining routing topology in a computer network, and comprises obtaining IGP information to determine the effects of routing protocols on network topology; obtaining EGP information by obtaining Border Gateway Protocol (BGP) information utilizing an EGP peer; and utilizing the IGP and EGP information to create topological network views.

In still another embodiment, the invention provides a method and system for obtaining IGP information by querying IGP link state databases.

In still another embodiment, the invention comprises a method for obtaining IGP network information useful in determining network routing topologies, comprising querying a router for its router identifier and all its area identifiers, counting the router's number of area identifiers to determine whether the router is an ABR or an ASBR, querying the router's link state database for the lowest area identifier on the router, importing all the Type 1 and Type 2 LSAs for that area into the database of the network discovery software engine, importing from the router's link state database only those networks outside the router's autonomous system that are also directly connected to an ASBR, then moving to the next highest area identifier in the router's database to repeat importing Type 1 and Type 2 LSAs for that area into the database of the network discovery software engine and importing from the router's link state database only those networks outside the router's autonomous system that are also directly connected to an ASBR repeating this process until there are no more areas on the router that have not been processed, then starting with the lowest area identifier discovered, sweeping all networks in the area making LSAs other than Type 1 or Type 2, and repeating the entire process for every router discovered.

In still another embodiment, a method in accordance with the invention comprises obtaining EGP information, useful in determining network routing topologies, by obtaining BGP information utilizing an EGP peer, by using a software based routing engine on a host that the network discovery software is installed on, configuring the routing software to enable the specific EGP and to announce only the host route to the software-based router, establishing a peer relationship with an EGP speaking router in the network, loading the EGP database from the EGP router, and importing the EGP database into the network discovery software for processing.

In still another embodiment, a method in accordance with the invention comprises obtaining and utilizing the IGP and EGP information, useful in creating topological network views, by instantiating the routing protocol created topology using routing and software methods described in U.S. Pat. No. 6,108,702 titled "Method and Apparatus for Determining Accurate Topology Features of a Network," issued Aug. 22, 2000 and incorporated herein by reference in its entirety, drawing a map of the network starting with IGP areas and allowing the user to select the BGP topology or the EGP topology including confederations, communities, and route reflectors.

In still another embodiment, the invention provides a method and system for determining routing topology in a computer network, and comprises obtaining IGP information to determine the effects of routing protocols on network topology using techniques described herein; obtaining EGP information by obtaining BGP information utilizing an EGP peer by using a software based routing engine on a host that the network discovery software is installed on, configuring the routing software to enable specific the EGP and to announce only the host route to the software-based router, establishing a peer relationship with an EGP speaking router in the network, loading the EGP database from the EGP router, and importing the EGP database into the network discovery software for processing; and utilizing the IGP and EGP information to create topological network views by instantiating the routing protocol created topology using routing and software methods described, for example, in the above referenced U.S. Pat. No. 6,108,702. The method further involves drawing a map of the network starting with IGP areas and allowing the user to select the BGP topology or the EGP topology including confederations, communities, and route reflectors.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

The present invention will now be described in detail with reference to the accompanying drawings in FIGS. 1-12.

Figure 1:
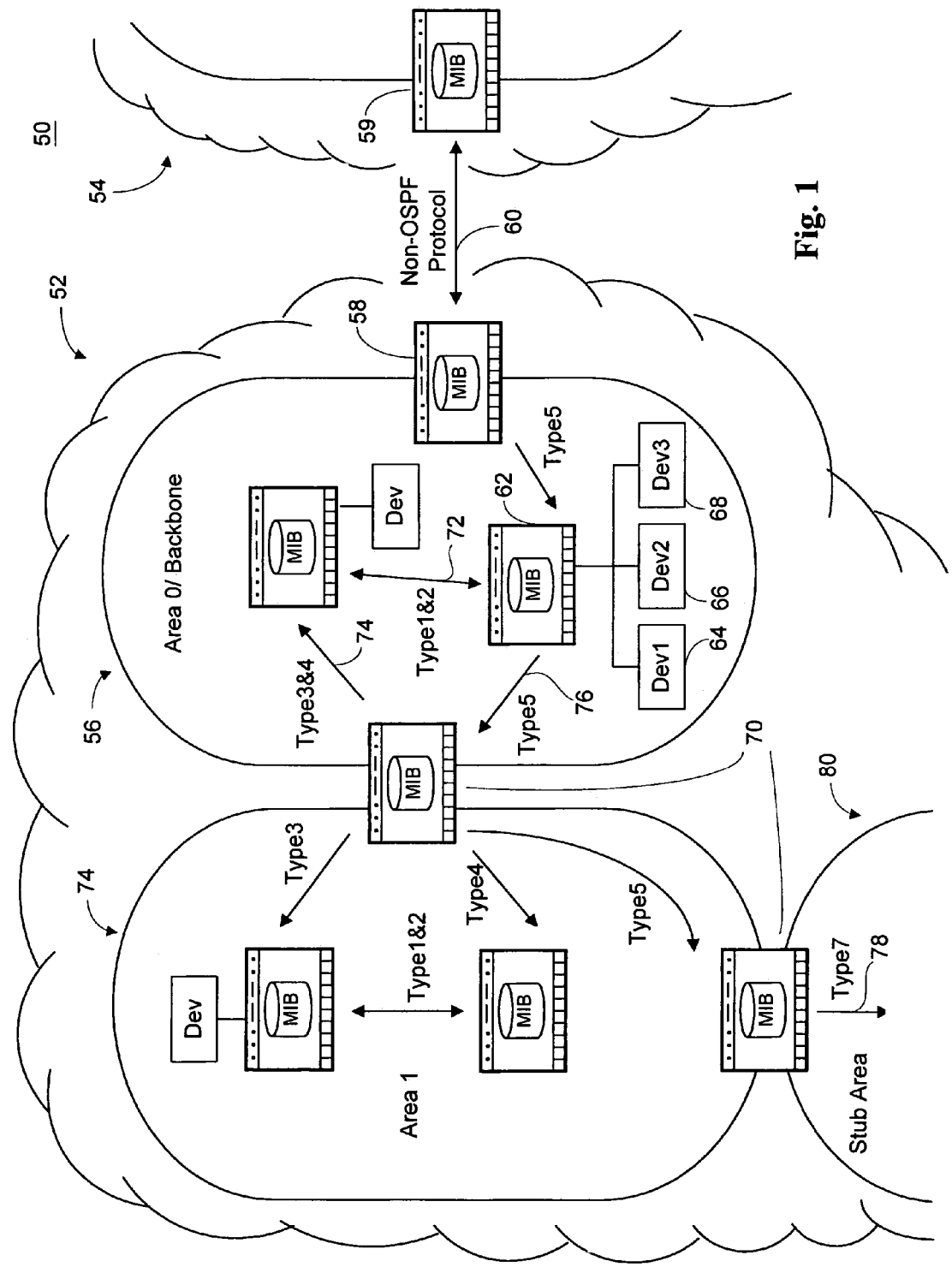
FIG. 1 is a diagram depicting an autonomous computer network.

FIG. 1 illustrates an exemplary computer network 50 analyzed using the method and system of the present invention. The term "computer network" as used herein refers generally to individual computer networks and combinations thereof. The exemplary network 50 includes two autonomous systems 52, 54. An autonomous system boundary router (ASBR) 58 of autonomous system 52 is connected to an ASBR 59 of the second autonomous system 54.

Every autonomous system contains at least one Area 0 or backbone 56 containing an ASBR 58. In addition to an ASBR 58, Area 0 56 may contain internal area routers 62 connected to other internal area routers 62 and/or additional network devices such as a printer 64, a network server 66, or some other networkable device 68 as known in the art. Area 0 56 may also contain an area border router (ABR) 70 connected to other areas 74 or stub areas 80 within the autonomous system 52.

In the preferred embodiment, all ASBRs 58, internal area routers 62, and ABRs 70 of the autonomous system 52 communicate using the Open Shortest Path First (OSPF) protocol as an Interior Gateway Protocol (IGP). OSPF protocol, an IGP used to distribute routing information within a single autonomous system, uses flooding between routers to exchange link state advertisements (LSAs) describing the status of each router's network interface. These LSAs associated with the IGP are contained in each router's Management Information Base (MIB) and provide an accurate view of all the routers and networks in a particular area. The ASBR 58 of the first system 52 communicates with the ASBR 59 of the second system 54 using a non-OSPF protocol 60 as known in the art.

There are several types of LSAs used by routers. Type 1 LSAs 72 are Router Link advertisements which are flooded in the area a router belongs to and describe the states of a router's link to the area. Type 2 LSAs 72 are Network Link advertisements which are flooded in the area a router belongs to describing the set of other routers attached to a particular network.

OSPF uses areas to limit the flooding of the entire autonomous system and reduce network congestion. ABRs 70 receive Type 1 and 2 LSAs 72, but do not flood them on to additional areas 74 within the autonomous system 52. Instead, Type 3 LSAs 74 are Summary Link advertisements generated by Area Border Routers and describe intra-area routes. In addition, Type 4 LSAs 74 are Summary Link advertisements generated by Area Border Routers and describe routes to the Autonomous System Boundary Router(s). Type 5 LSAs 76 are originated by the Autonomous System Boundary Router(s) which are flooded throughout all areas of a particular autonomous system (except stub areas) and describe routes to routers outside the autonomous system. An autonomous system 52 may contain a stub area 80 which does not receive all type 5 LSAs 76. Instead, Type 7 LSAs 78 summarize and filter selected type 5 LSAs which are directed to stub areas. This further reduces network congestion in the stub area 80.

Figure 1A:
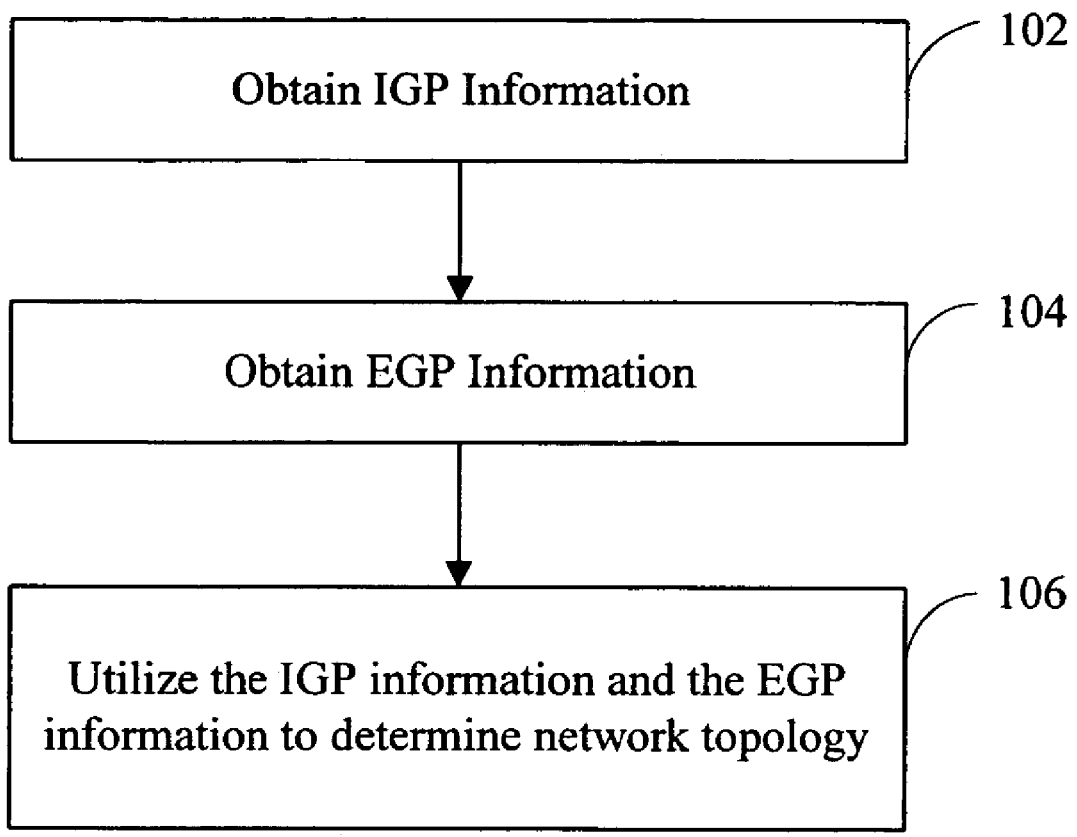
FIG. 1a is a flow chart depicting a method for determining routing topology in a computer network according to one embodiment of the invention.

FIG. 1a depicts a flow chart showing a method of using routing protocol data according to one embodiment of the invention. At step 102, IGP information is obtained about a computer network. In one embodiment, IGP information is utilized to determine the effects of routing protocols on network topology. In other embodiments the IGP information collected as described herein may be used for other purposes, such as to track the flow of viruses or other security threats in a network. At step 104, EGP information is obtained about the computer network. In one embodiment, the EGP information is obtained by obtaining Border Gateway Protocol (BGP) information utilizing an EGP peer. At step 106, the IGP information and the EGP information are utilized to determine network topology. The network topology so determined has the advantage of having taken into account not only the physical topology, but also the routing topology, of the computer network.

In one embodiment of the invention, step 102 as depicted in FIG. 1a comprises the following. First, a network management protocol is utilized to query routing tables for internal routing protocols, and then to determine the effect of these internal routing protocols on the network topology. The resultant network topology may be computed through a variety of hardware or software implemented methods. For example, in one embodiment, the first component of the invention uses the Simple Network Management Protocol (SNMP) to query the Management Information Base (MIB) of routers within a given network for IGPs and then determines the effect of these routing protocols on the network topology through a software program and an associated database.

Every router in a particular area will store at least that same database. In other words, some information regarding the IGP within the MIBs of routers in a particular area is redundant and contained in each area router. Whether a particular router's MIB contains such redundant information can be determined quickly by querying the type of LSA contained with that router's MIB. The same type 1 and type 2 LSAs, for example, are contained within the MIB of every router in a particular area of an autonomous system.

Accordingly, network discovery can be accomplished much more efficiently utilizing this information, since further analysis of the redundant information is not required for each router. Much of the IGP routing topology for a particular area can be accurately represented from the information obtained from just one router. Further analysis is only required on the remaining non-redundant information contained in the MIBs of the routers of a particular area. Similarly, storage of the MIB data in a topology database as described below results in the need to query only updates to the MIBs since a previous analysis, thus further streamlining the routing protocol discovery process.

In one embodiment, step 104 as depicted in FIG. 1a comprises the following. First, an EGP router peer is established, running an exterior gateway protocol, such as, for example, BGP4. Typically, this would involve a router being queried for its BGP tables, and the router having to format up to ninety thousand entries or more and format in an SNMP readable fashion, packetize them and send them to the computer issuing the SNMP query. This places a great load on the router. The methodology employed at step 104, however, circumvents this problem by running an EGP on a host, configuring the host to peer with an EGP, and then having a software daemon query local tables and add them to its network database.

In one embodiment, step 106 comprises combining the information obtained from the first two components to allow the creation of an IGP and EGP topology view of the network. This component leverages the collected IGP and EGP information by using the information to determine data points to create a visual representation of the routing topology of the network. Thus, in one embodiment, the present invention utilizes both information contained in router configuration databases as well as in EGP information obtained by utilizing a special peer router running a BGP, to create a protocol-based network topology, which topology may then be presented in a variety of tabular or visual formats.

Because the system is computationally efficient, and minimizes the need to redundantly collect data, real-time information can be produced to better understand dynamically changing networks. Furthermore, by better understanding network topologies and traffic patterns, more effective network configurations can be produced and network traffic or routing problems can be better understood. Still further, these techniques can be used to understand, detect and, in some cases, eliminate certain security threats such as worms or other viruses which propagate on a network. Thus, the present invention significantly contributes to network performance understanding and optimization.

Figure 2A:
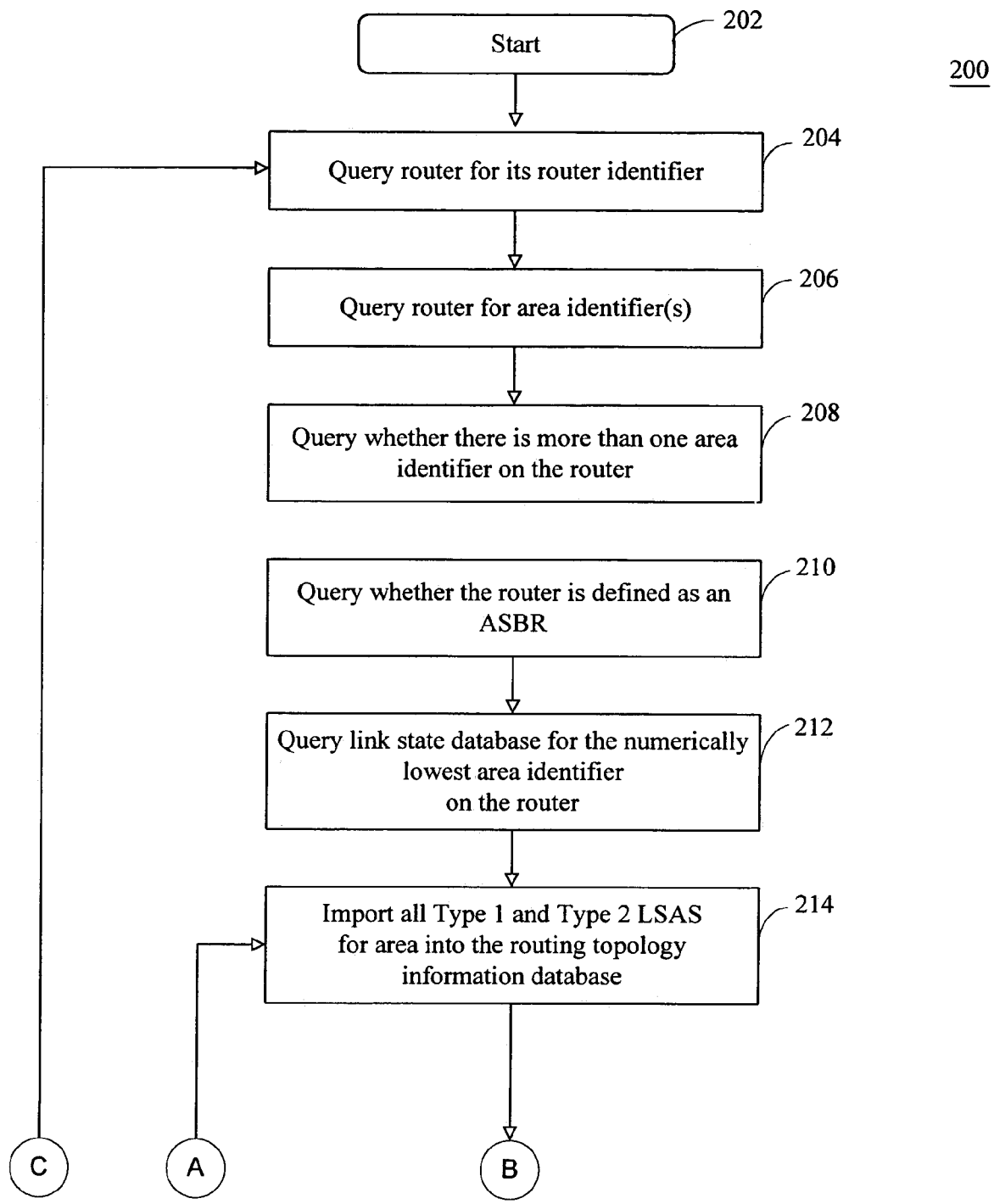
FIGS. 2A-2B contain a flow chart depicting a method for obtaining IGP network information useful in determining network routing topologies, according to one embodiment of the invention.
Figure 2B:
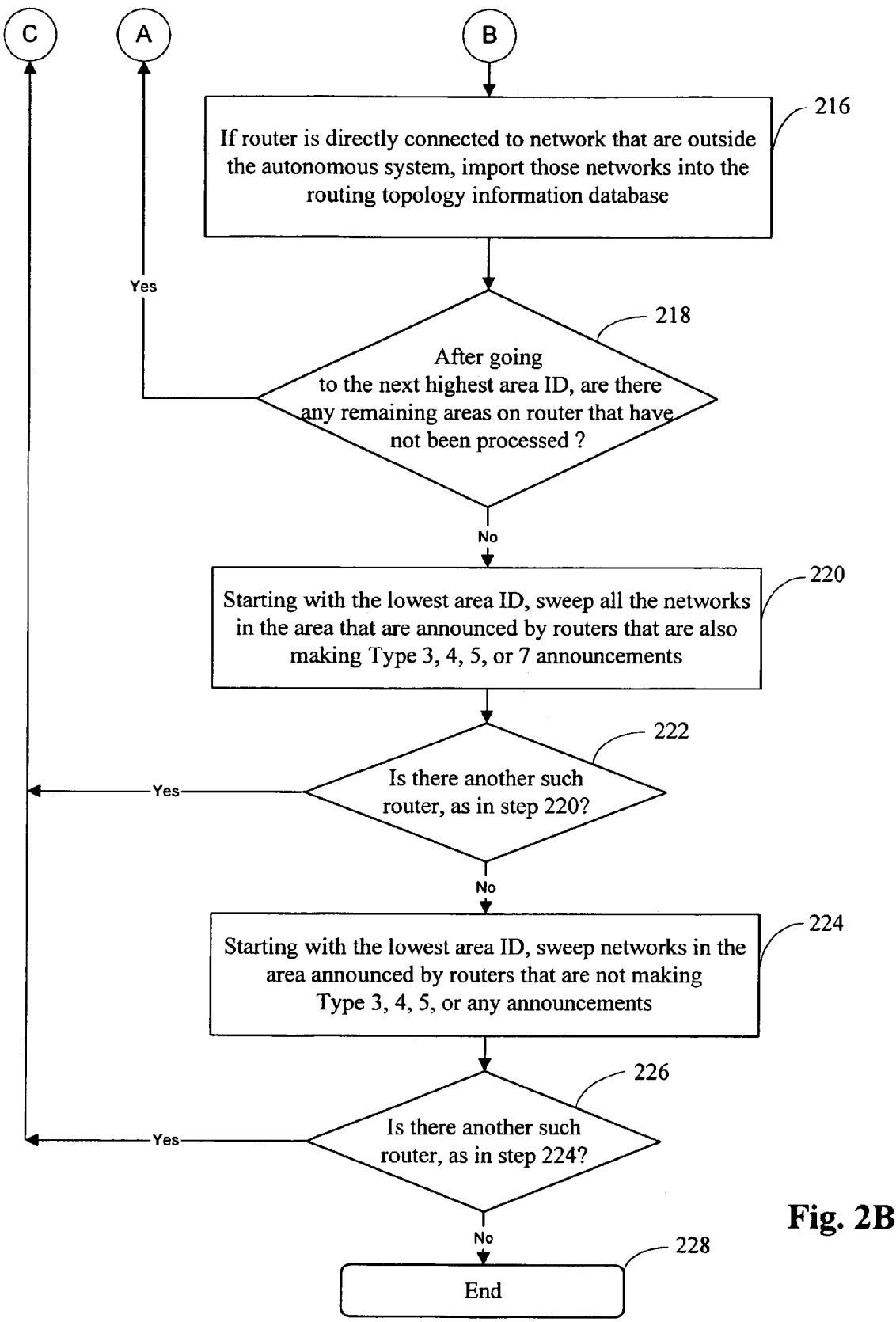

In one embodiment, step 102 of FIG. 1a comprises the following method 200, as depicted in FIGS. 2A-2B. The method 200 starts at step 202. At step 204, the router is queried for its router identifier. This is done to identify all of the networks that the router announces as being tied to the identifier, and also to know whether all of the IGP-speaking routers in the area or autonomous system have been discovered.

At step 206, the router is queried for its area identifier. A router can belong to more than one area. The area(s) that a router are in give it its context for any advertisements that it makes about what network it is connected or "knows" about. Thus, the method "moves" from area to area, but prevents "leakage" in of unwanted networks.

Step 208 queries whether there is more than one area identifier on the router. If so, then it belongs to more than one area inside the autonomous system, and the router is an Area Border Router (ABR).

Step 210 queries whether the router is defined as an Autonomous System Boundary Router (ASBR). A router can border only one area and still be connected to networks that are outside its area, which makes the router an ASBR.

Step 212 queries the link state database for the numerically lowest area identifier on the router. This step starts the sweeping of the networks in each area. The order is arbitrary, but may start with the router 0.0.0.0.

At step 214, all Type 1 and Type 2 LSAs for an area are imported into the routing topology information database. The router identifiers of all the routers in the area are announced as type 1 advertisements and the networks in the area are announced as type 2 advertisements. There are several reasons for looking at only an announcement from inside the system. First, networks announced by the routers outside the area may be summarized, so that instead of announcing each of a thousand networks, an area border router can be configured to announce those networks as though they were a single, much larger network. Second, networks outside the autonomous system can also be announced, and the method 200 only sweeps those networks outside the autonomous system that are directly connected to one of the routers inside the autonomous system.

At step 216, if the router is directly connected to networks that are outside the autonomous system, the method 200 imports those networks into the routing topology database. Thus, only autonomous networks that are directly connected to an autonomous system boundary router are imported, preventing "leakage" in of unwanted networks.

At step 218, after going to the next highest area identifier, the method 200 queries whether there are any remaining areas on the router that have not been processed. If so, the method returns to step 214 to process the remaining area(s). If not, the method 200 proceeds to step 220.

At step 220, starting with the lowest area identifier, the method 200 sweeps all the networks in the area that are announced by routers that are also making Type 3, 4, 5, or 7 advertisements. Thus, the method 200 sweeps for networks announced by routers that are connected to other areas and the autonomous system.

At step 222, the method 200 queries whether there is another such router (as from step 220). If so, the method 200 returns to step 204 to begin processing the next router. If there are no other such routers, the method proceeds to step 224.

At step 224, starting with the lowest area identifier, the method 200 sweeps all the networks in the area that are announced by routers that are not making Type 3, 4, 5, or 7 advertisements.

At step 226, the method queries whether there is another such router. If there is, the method returns to step 204 to begin processing the next router. If there is no other such router, then the method ends at step 228.

Figure 3:
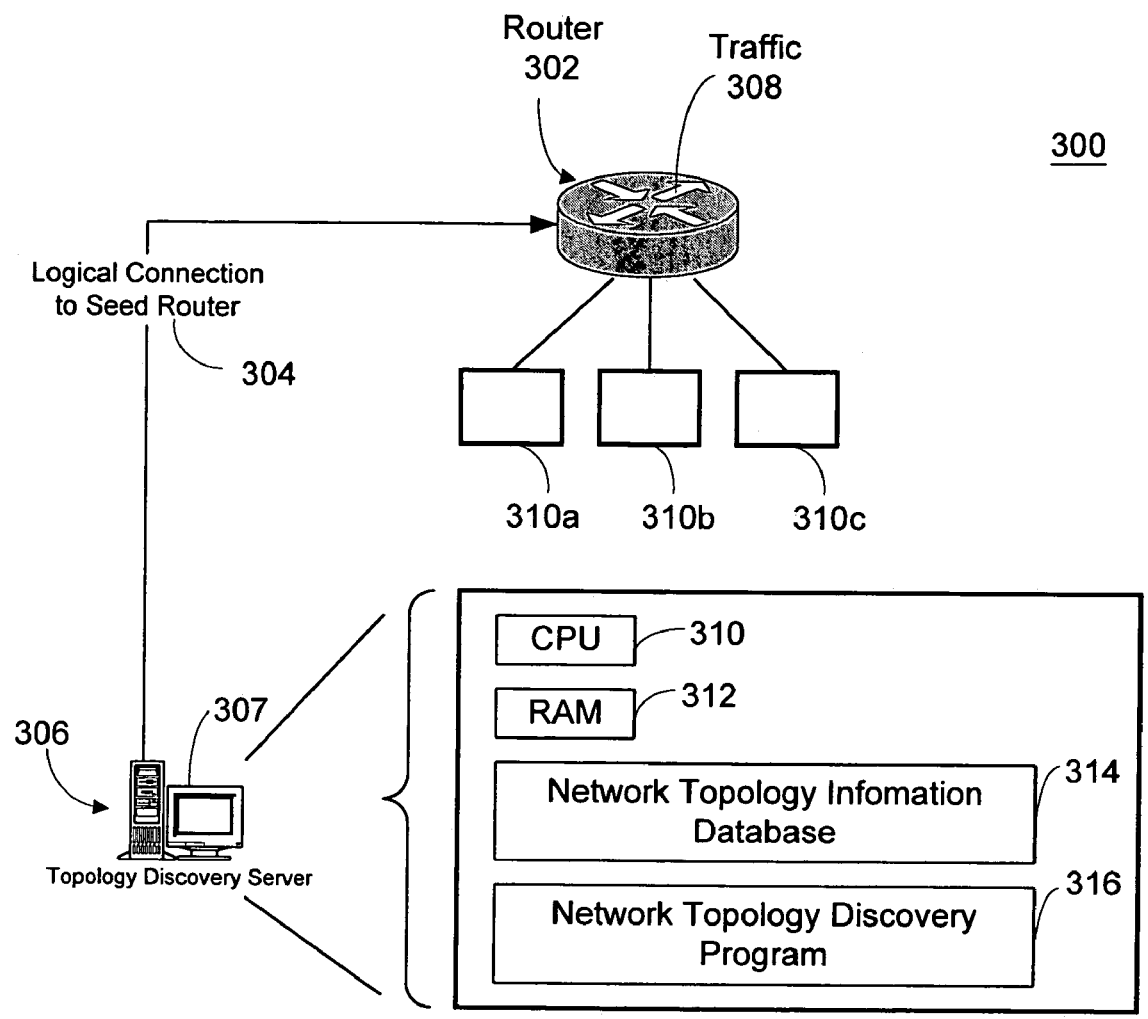
FIG. 3 is a diagram graphically illustrating step 202 of the method of FIGS. 2A-2B.

FIGS. 3 through 9 are diagrams that graphically illustrate steps in the method 200 of FIGS. 2A-2B. FIG. 3 is a diagram graphically illustrating one embodiment of step 202 of the method of FIG. 2A, and shows a Topology Discovery Server computer 306 and a router 302. The Topology Discovery Server computer 306 comprises a Central Processing Unit (CPU) 310, Random Access Memory (RAM) 312, a Network Topology Information Database 314, and a Network Topology Discovery Program 316 stored on a computer readable medium and executed in the CPU 310. The Network Topology Discovery Program 316 is used to execute steps 204-226 of FIGS. 2A-2B to obtain information that is then stored in Network Topology Information Database 314. The computer 306 may additionally comprise a monitor 307, keyboard, pointing device, and other typical input/output components and peripheral devices associated with computers. The router 302 directs data traffic 308 between one or more computer networks 310a-c (three are shown), and/or between computers or other components within the networks 310a-c, and is in communication with the Topology Discovery Server computer 30 through logical connection 304. As shown in FIG. 3, the Topology Discovery Server computer 306 queries the router 302 for its router identifier, for example, 0.0.0.1.

Figure 4:
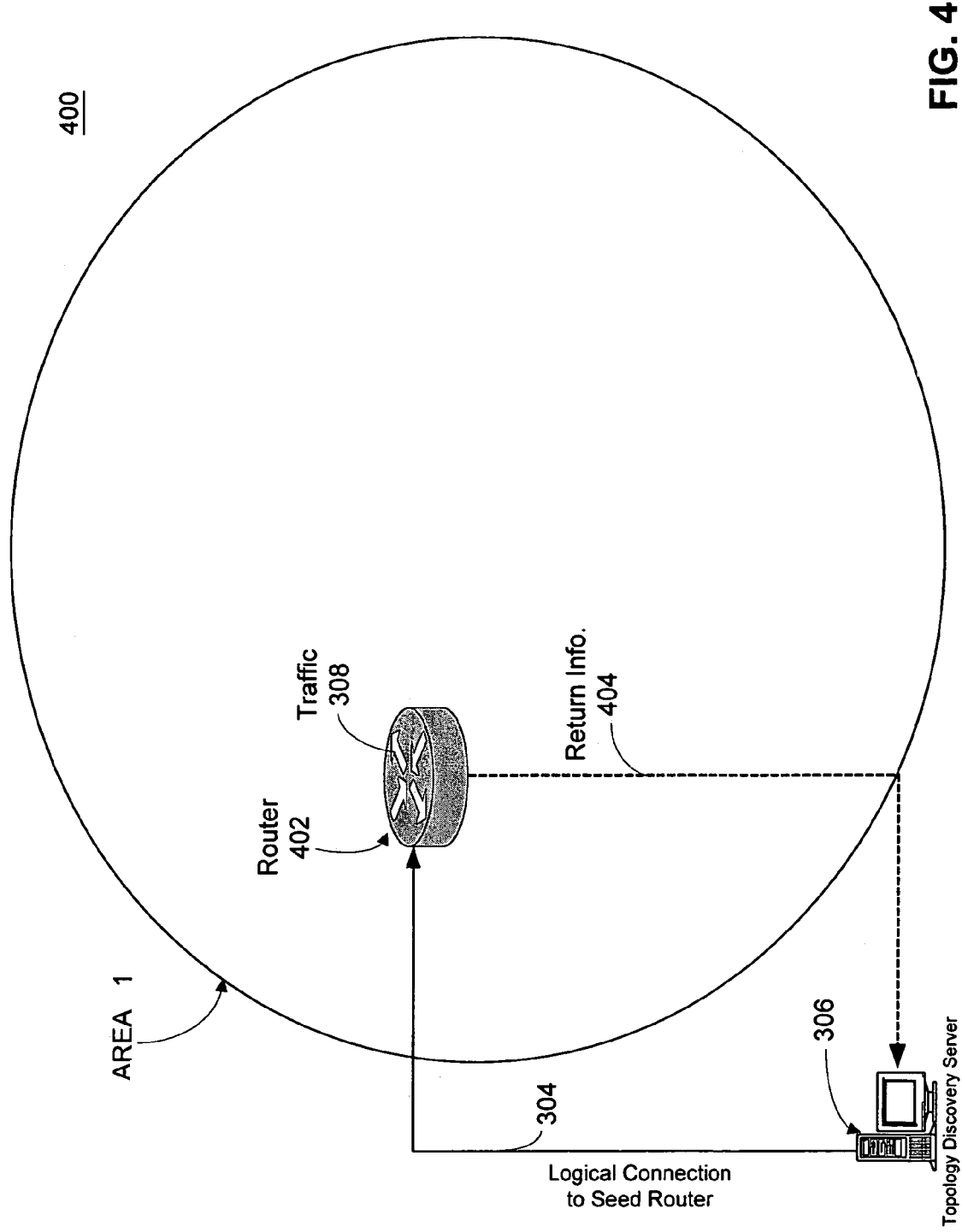
FIG. 4 is a diagram graphically illustrating steps 204-214 of the method of FIGS. 2A-2B, in the case where there is only one area identifier.

FIG. 4 is a diagram graphically illustrating steps 204-214 of the method of FIGS. 2A-2B, in the case where there is only one area identifier. FIG. 4 shows, in addition to the Topology Discovery Server computer 306, the area (Area i) associated with the router 402 by the router's area identifier, e.g., "Area 1." Return information 404, i.e., information obtained from: the router 402, is communicated to the Topology Discovery Server computer 30 in accordance with the Network Topology Discovery Program 316, which return information is then stored in the in Network Topology Information Database 314.

Figure 5:
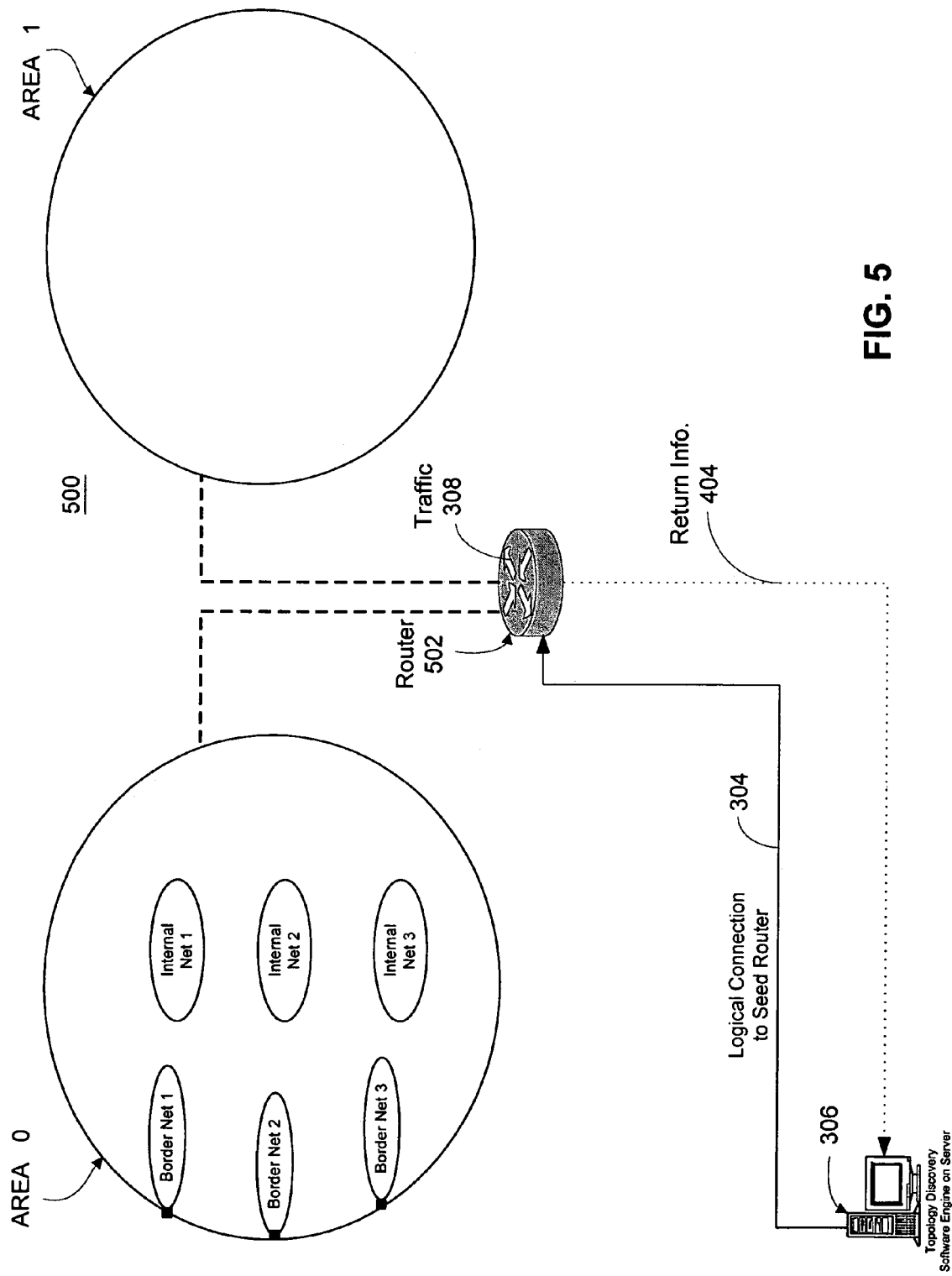
FIG. 5 is a diagram graphically illustrating steps 206-214 of the method of FIGS. 2A-2B, in the case where there is more than one area identifier.

The diagram in FIG. 5 illustrates the scenario in which the method determines in step 208 that there is more than one area identifier, i.e., Areas 0 and 1. The router 502 is then identified in step 210 as an ASBR to Area 1. Through steps 212 and 214, the Network Topology Discovery Program 316 on server 306 queries the link state database for the numerically lowest area, i.e., Area 0, and imports the Type 1 and Type 2 LSAs for that area into the Network Topology Information Database 314. As explained above, in some embodiments only updated information is retrieved if this query has previously been performed.

Figure 6:
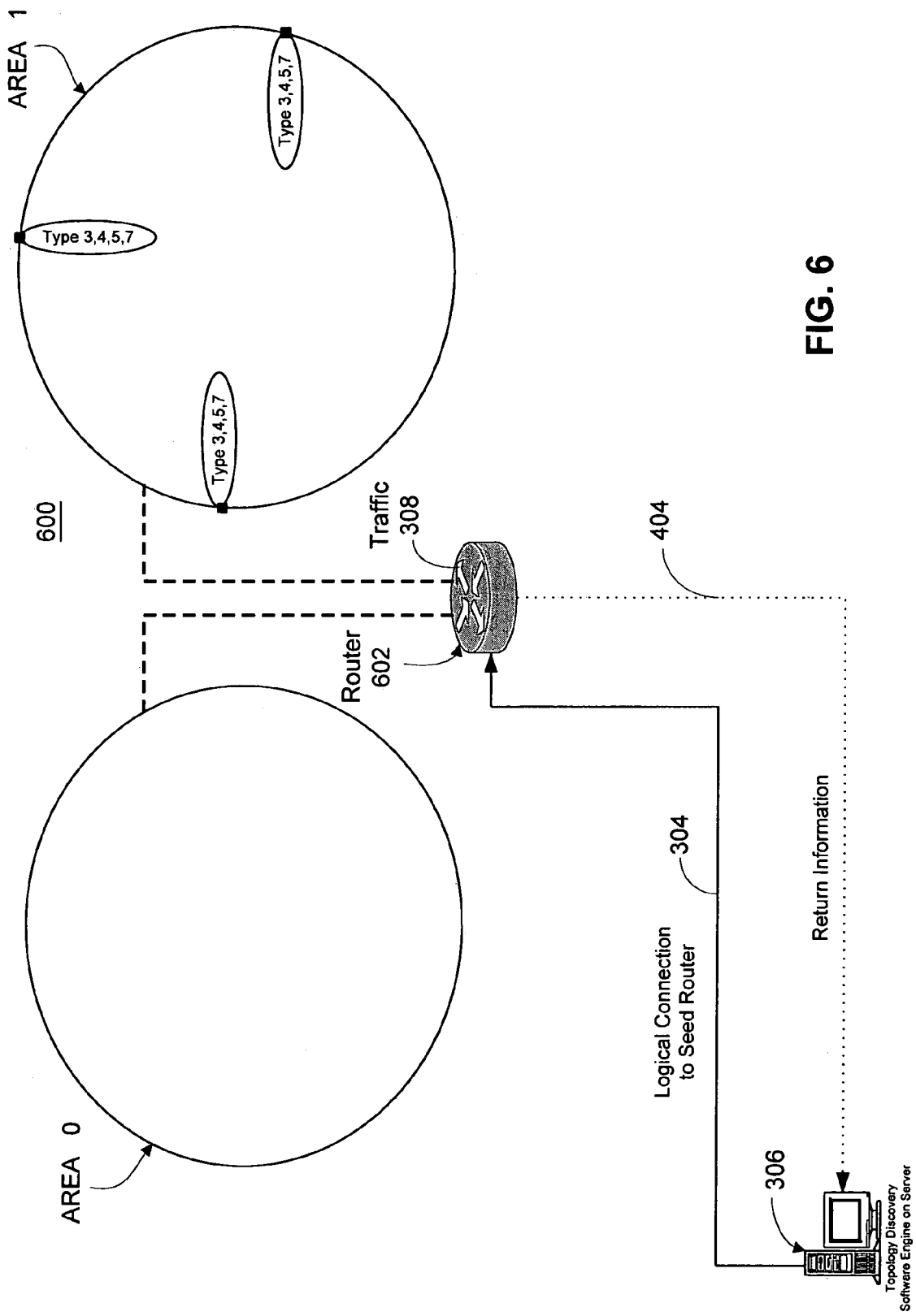
FIG. 6 is a diagram graphically illustrating steps 216-220 of the method of FIGS. 2A-2B.
Figure 7:
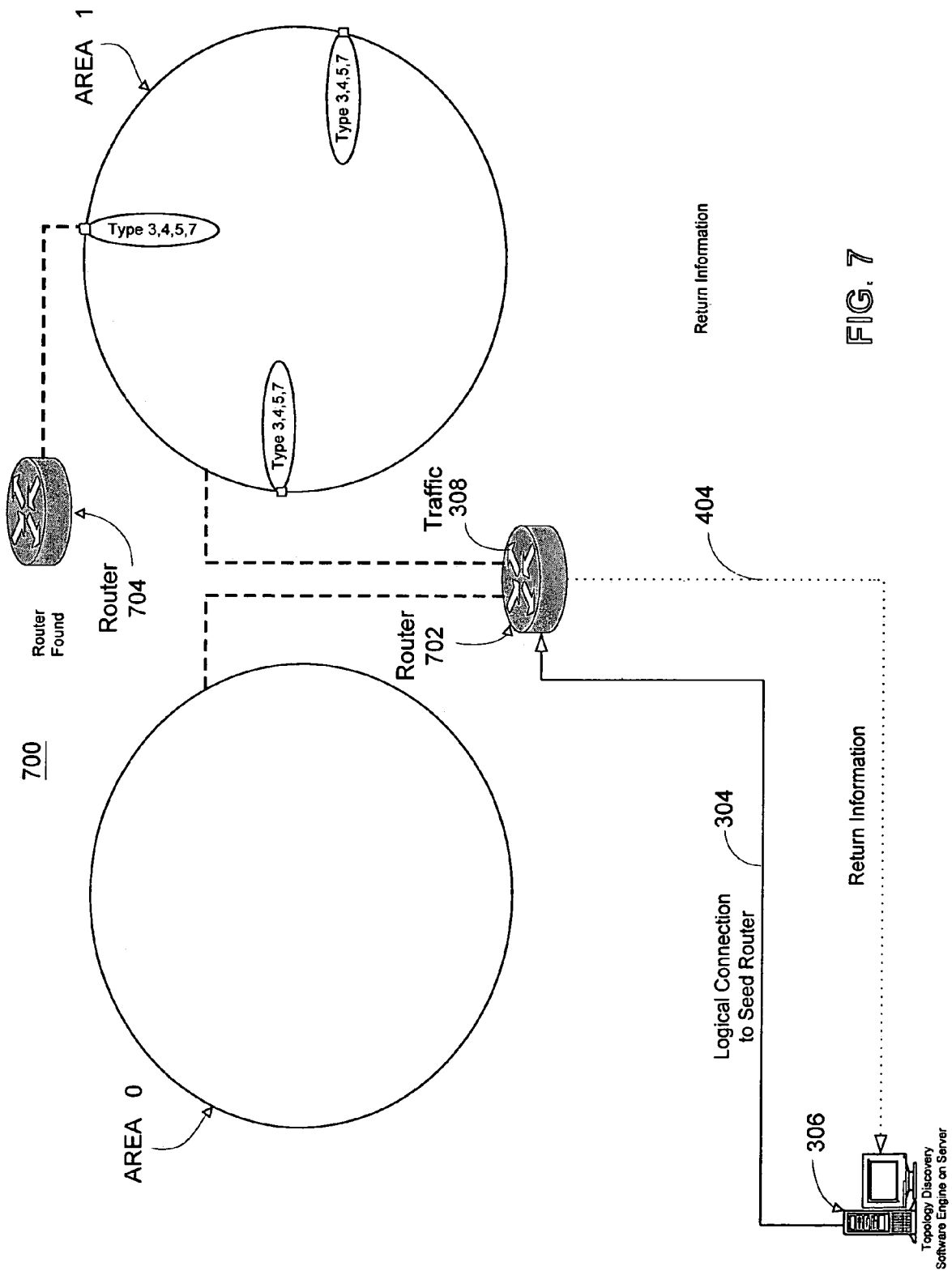
FIG. 7 is a diagram graphically illustrating step 222 of the method of FIGS. 2A-2B.

FIG. 6 shows similar processing being performed, per step 218, on the area with the next highest area identifier, i.e., Area 1. In addition, the diagram in FIG. 6 shows, per step 220, a sweep being performed on the networks in the area that are announced by routers making Type 3, 4, 5, or 7 announcements. The resulting information is returned via return path 404 from router 302. As a result, router 704 is found as shown in FIG. 7. The process of querying routers, per steps 204-218, is then performed for this newly found router 704.

Figure 8:
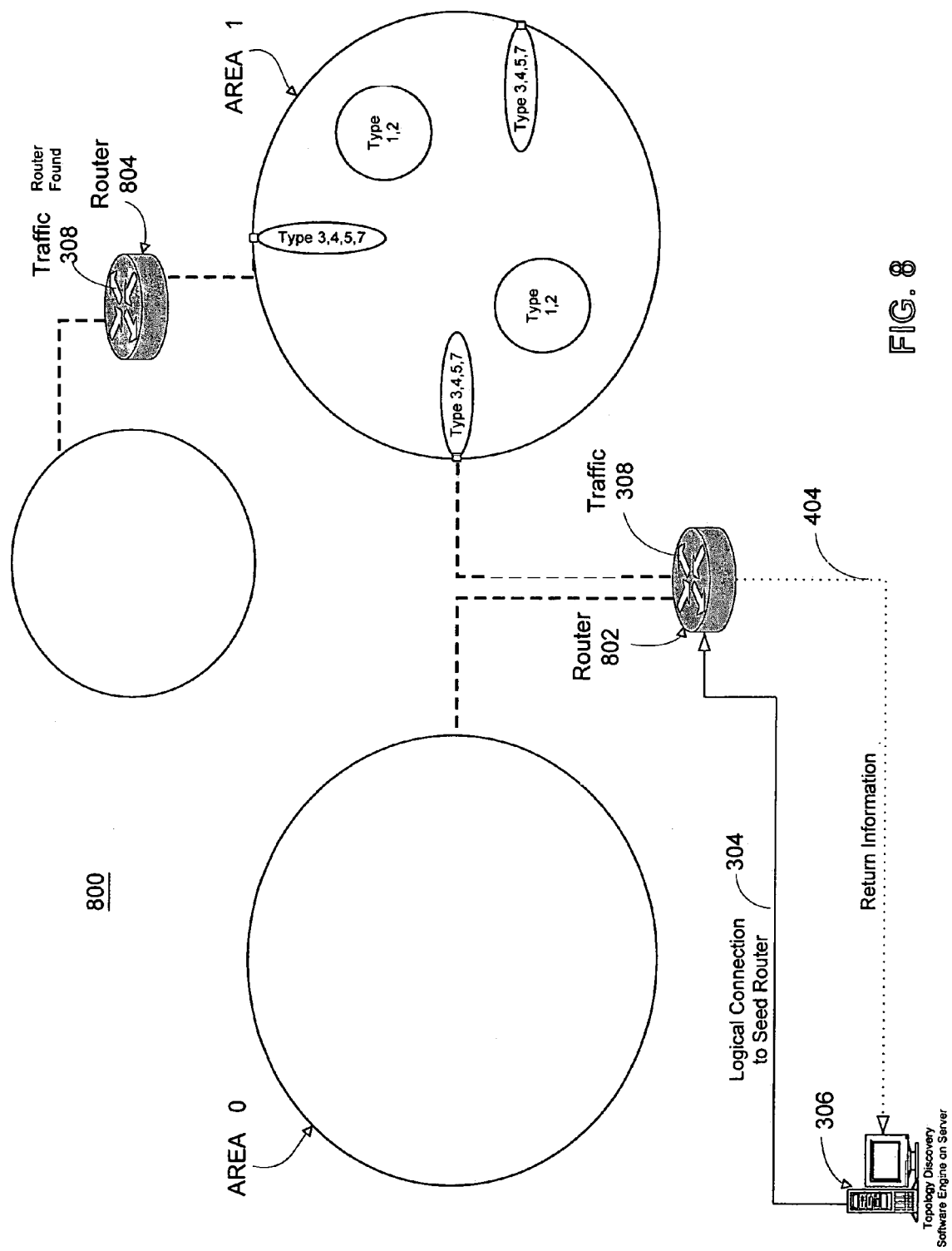
FIG. 8 is a diagram graphically illustrating step 224 of the method of FIGS. 2A-2B.
Figure 9:
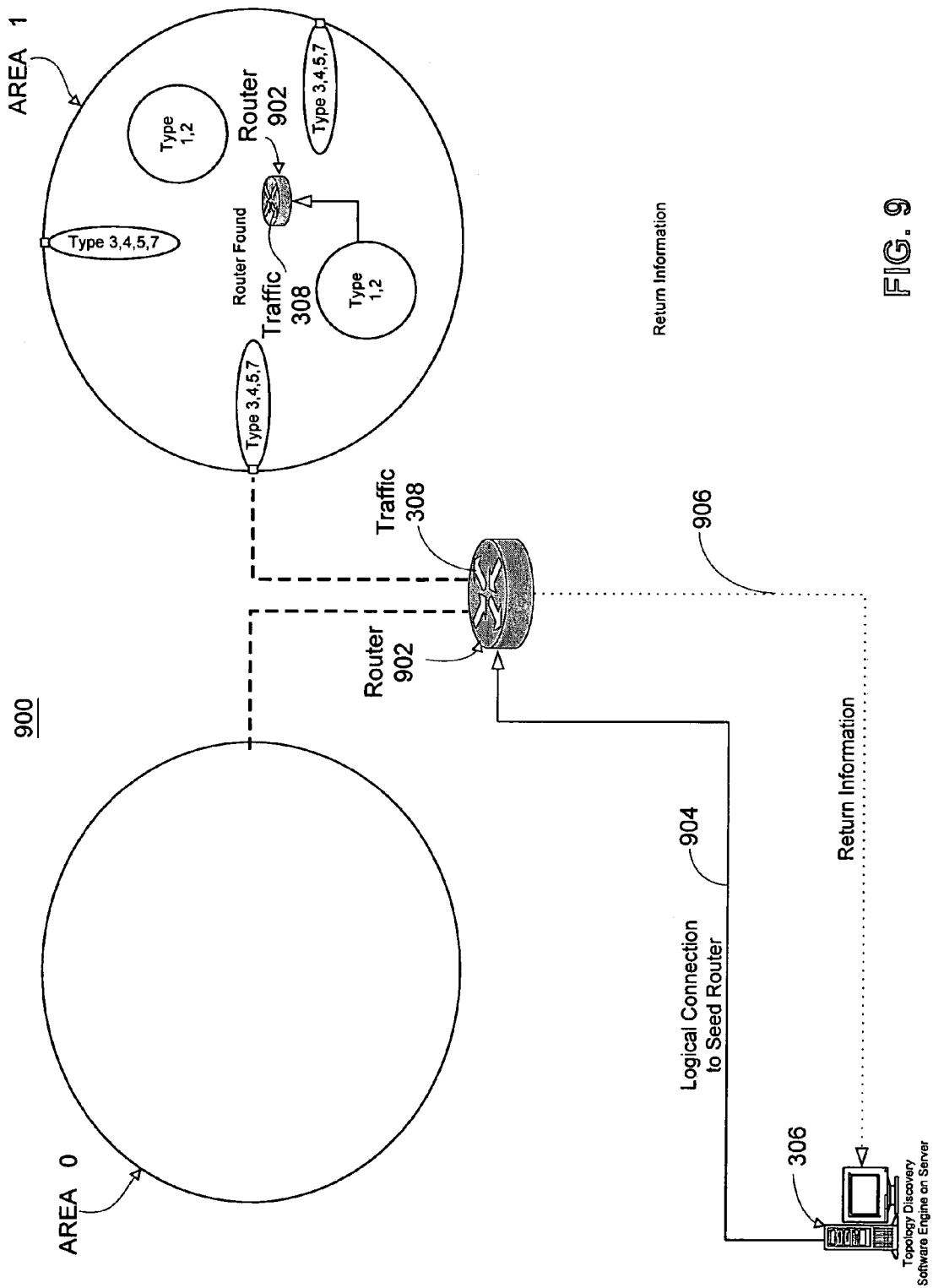
FIG. 9 is a diagram graphically illustrating step 226 of the method of FIGS. 2A-2B.

The diagram in FIG. 8 shows, per step 224, a sweep being performed on the networks in the area announced by routers that are not also making Type 3, 4, 5, or 7 announcements. Two such routers 804 are swept and, as shown in FIG. 9, one such router 902 is found. The process starting with step 202 is then performed for this router.

Figure 10A:
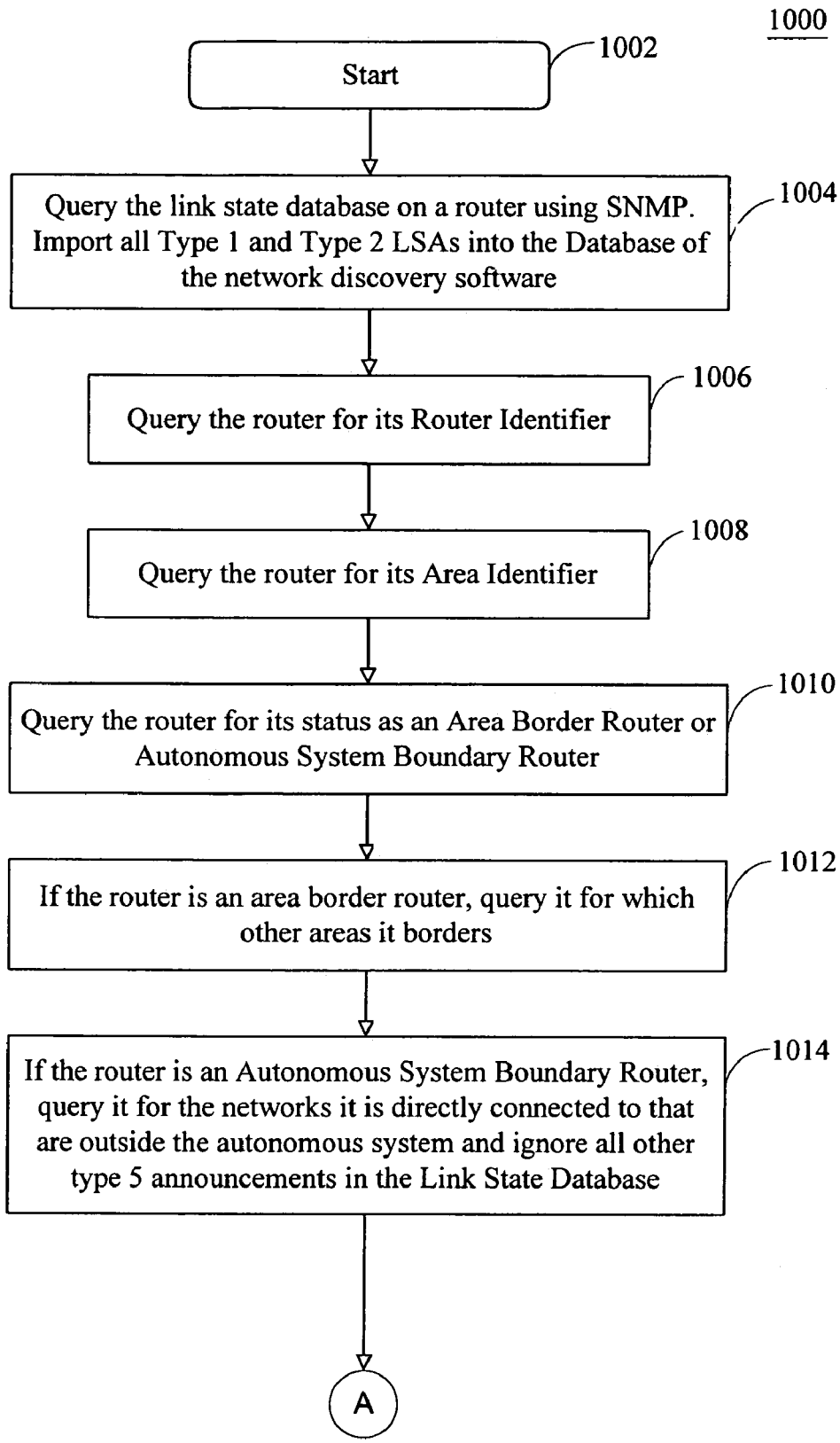
FIG. 10 is a flow chart depicting another embodiment of a method for obtaining IGP network information useful in determining network routing topologies.
Figure 10B:
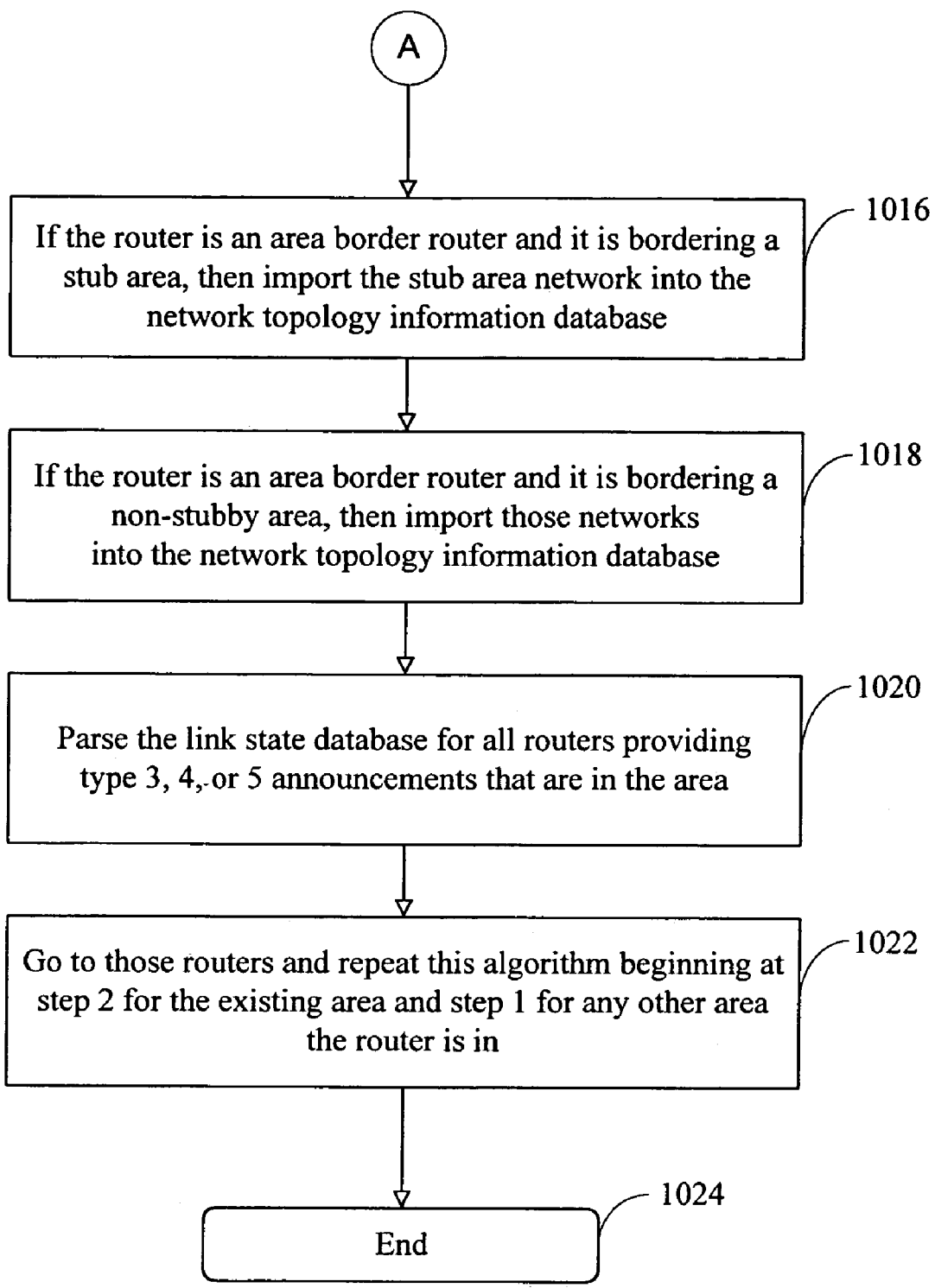

FIG. 10 is a flow chart depicting another embodiment of a method 1000 for obtaining IGP information useful in determining network topologies. The method 1000, carried out by the Network Topology Discovery Program 316, starts at step 1002. Step 1004 queries the link state database on a first router in a particular area is using signaling network management protocol (SNMP), and imports all Type 1 and Type 2 LSAs are imported into a routing topology information database. Type 1 and Type 2 LSAs are contained in each router of a particular area and are examples of redundant information.

Step 1006 queries the router for its Router Identifier using SNMP and import this information into the Database of the network discovery software. This information is used to correlate the IGP information obtained in steps 1004-1020 with a particular router and assists in IGP Topology Discovery.

Step 1008 queries the router for its Area Identifier using SNMP and import this information into the Database of the network discovery software. This Area Identifier will be used in step 1010 to determine whether the router is an Area Boundary Router (ABR) or an Autonomous System Boundary Router (ASBR).

Step 1012, if the router is an ABR, queries the router for which areas it borders and imports this information into the Network Topology Information Database 314.

Step 1014, if the router is an ASBR, queries the router for the networks it is directly connected to that are outside the autonomous system, imports this information into the Network Topology Information Database 314 of the network discovery software, and ignores all other similar and related Type 5 LSAs contained in the link state database. Type 5 LSAs are used by the IGP to identify other autonomous systems.

Step 1016, if the router is an ABR and it is bordering a stub area, imports the stub area network information into the Network Topology Information Database 314. A stub area is an area that is connected to exactly one other area.

At step 1018, if the router is an ABR and it is bordering a non-stubby or less stubby area, imports this additional network information into the Database of the network discovery software. A non-stubby or less stubby area is a virtual link to another area.

Step 1020 parses the link state database for all routers providing Type 3, Type 4, or Type 5 LSAs that are in the area, and ignores all additional Type 1 and Type 2 LSAs, since this redundant information was obtained from the first router in the area that was queried and is contained in all area routers.

Step 1022 goes to those routers and repeats this algorithm beginning at step 1008 for the existing area and step 1006 for any other area the router is in. Finally, the method 1000 ends at step 1024.

Figure 11:
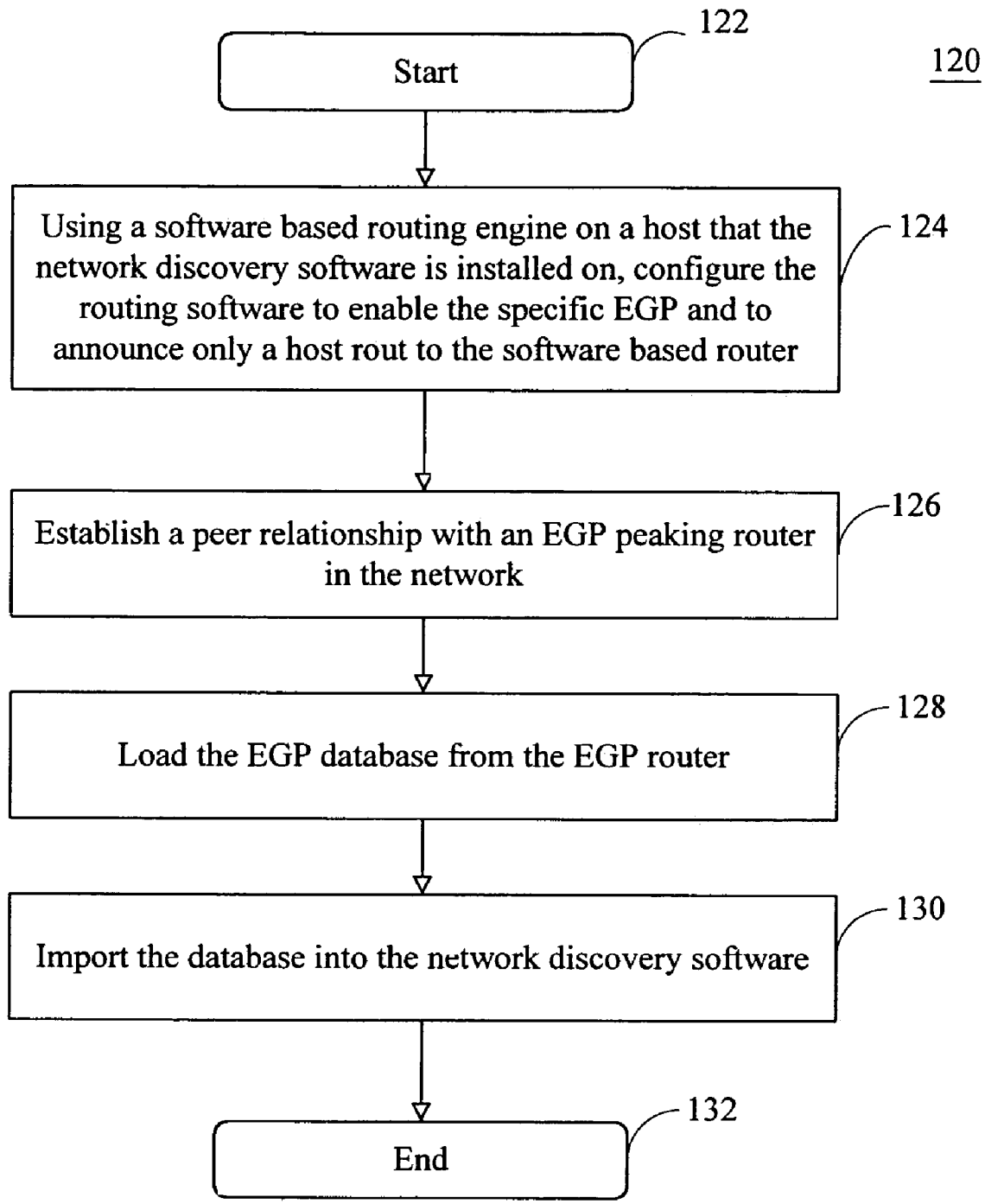
FIG. 11 is a flow chart depicting a method for obtaining EGP information useful in determining network routing topologies, according to one embodiment of the invention.

FIG. 11 is a flow chart depicting a method 120 for obtaining EGP information useful in determining network routing topologies, according to one embodiment of the invention. At step 124, using a software based routing engine, as known in the art, on a host that the Network Topology Discovery Program 316 is installed on, the routing engine is configured to enable the specific EGP and to announce only a host route to a software based router.

At step 126, a peer relationship is established with an EGP-speaking router in the network, to acquire EGP information and establish an EGP database. At step 128, the EGP database is loaded from the EGP router. At step 130, the EGP database is imported into the network discovery Network Topology Information Database 314, and then the method ends at step 132. The EGP information can then be utilized, for example, in addition to stored IGP information, to create views of the network topology, one method of which is described below with reference to FIG. 12.

Figure 12:
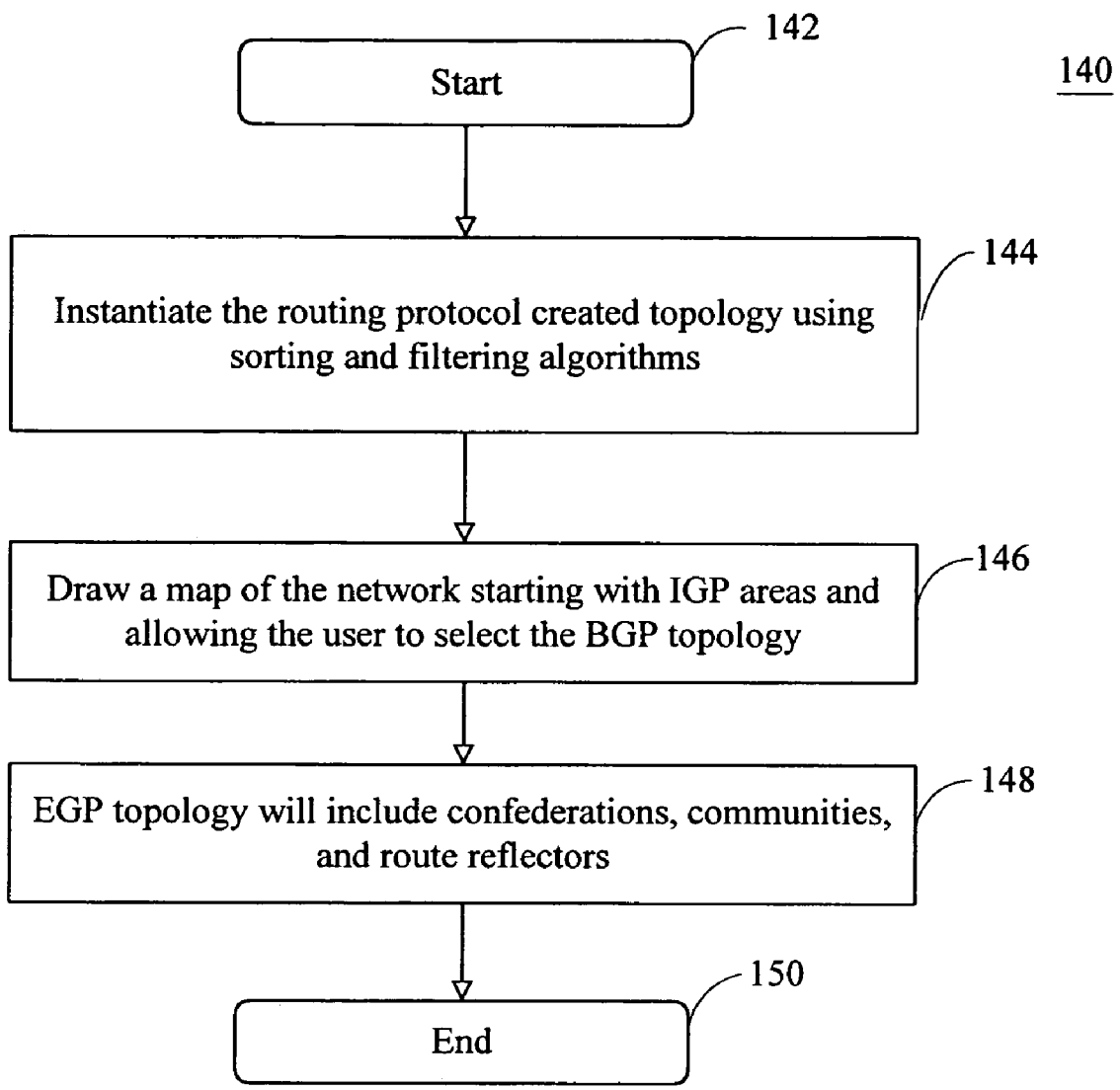
FIG. 12 is a flow chart depicting a method for utilizing IGP and EGP information to create a network topology view, according to one embodiment of the invention.

FIG. 12 is a flow chart depicting a method 140 for utilizing IGP and EGP information to create a network topology view, according to one embodiment of the invention. The method starts at 142, and, at step 144, a routing topology is created from the IGP and EGP information. One method of creating the routing topology is to use sorting and filtering algorithms to instantiate the routing protocol, as disclosed in above referenced U.S. Pat. No. 6,108,702. At step 146, a map is drawn of the network starting with IGP areas. A user is allowed to select the BGP topology to be displayed on the map. If shown, EGP topology includes confederations, communities, and route reflectors, step 148. The method ends at 150.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for determining a topology of a network, the method comprising:
    communicating with a first router in the network;
    querying a first link state database of the first router for first Type 1 and Type 2 link state advertisements in a first area;
    importing the Type 1 and Type 2 link state advertisement into a network topology information database; and
    sweeping all networks in the first area announced by the first router and which make Type 3, Type 4, Type 5 or Type 7 announcements.

2. The method as recited in claim 1, further comprising:
    querying the first router for a router identifier; and
    determining a number of areas connected to the first router.

3. The method as recited in claim 1, further comprising importing into the network topology information database additional topology information for all networks directly connected to the first router.

4. The method as recited in claim 1, further comprising:
    querying the first link state database for each respective area connected to the first router to determine respective Type 1 and Type 2 link advertisements for the respective areas; and
    importing into the network topology information database, the respective Type 1 and Type 2 link state advertisements.

5. The method as recited in claim 1, wherein when the sweeping locates a second router, the method further comprises:
    communicating with the second router;
    querying a second link state database of the second router for second Type 1 and Type 2 link state advertisements in a second area; and importing the second Type 1 and Type 2 link state advertisements into the network topology information database.

6. The method as recited in claim 1, further comprising sweeping all networks in the first area announced by the first router and which do not make Type 3, Type 4, Type 5 or Type 7 announcements.

7. The method as recited in claim 6, wherein when the sweeping locates a second router, the method further comprises:
   communicating with the second router;
   querying a second link state database of the second router for second Type 1 and Type 2 link state advertisements in a second area; and
   importing the second Type 1 and Type 2 link state advertisements into the network topology information database.

8. The method as recited in claim 5, further comprising sweeping all networks in the second area announced by the second router and which do not make Type 3, Type 4, Type 5 or Type 7 announcements.

9. The method as recited in claim 8, wherein when the sweeping locates a third router, the method further comprises:
   communicating with the third router;
   querying a third link state database of the third router for third Type 1 and Type 2 link state advertisements in a third area; and
   importing the third Type 1 and Type 2 link state advertisements into the network typology information database.

10. A method for determining a topology of a network, the method comprising:
   communicating with a first router in the network;
   querying a first link state database of the first router for first Type 1 and Type 2 link state advertisements in a first area;
   importing the first Type 1 and Type 2 link state advertisements into a network topology information database;
   querying the first router for a first area identifier;
   determining whether the first router is an autonomous system boundary router based on the first area identifier; and
   when the first router is an autonomous system boundary router, querying the first router for networks directly connected to the first router and ignoring all other Type 5 announcements in the first link state database.

11. The method as recited in claim 10, further comprising:
   parsing the first link state database for a second router in the first area having a second link state database and providing Type 3, Type 4 or Type 5 announcements in the first area;
   communicating with the second router;
   when the second router is in a second area,
      querying the second link state database of the second router for second Type 1 and Type 2 link state advertisements in the second area, and
      importing the second Type 1 and Type 2 link state advertisements into the network topology information database;
   querying the second router for a second area identifier;
   determining whether the second router is an autonomous system boundary router based on the second area identifier; and
   when the second router is an autonomous system boundary router, querying the second router for networks directly connected to the second router and ignoring all other Type 5 announcements in the second link state database.

12. The method as recited in claim 10, further comprising:
   parsing the first link state database for a second router in the first area having a second link state database and providing Type 3, Type 4 or Type 5 announcements in the first area;
   communicating with the second router;
   when the second router is in a second area,
      querying the second link state database of the second router for second Type 1 and Type 2 link state advertisements in the second area, and
      importing the second Type 1 and Type 2 link state advertisements into the network topology information database;
   querying the second router for a second area identifier;
   determining whether the second router is an area border router based on the second area identifier; and
   when the second router is an area border router, querying the second router for other areas bordered by the second router, and
   importing topologies of the networks in the other areas into the network topology information database.

13. A method for determining a topology of a network, the method comprising:
   communicating with a first router in the network;
   querying a first link state database of the first router for first Type 1 and Type 2 link state advertisements in a first area;
   importing the first Type 1 and Type 2 link state advertisements into a first network topology information database;
   querying the first router for a first area identifier;
   determining whether the first router is an area border router based on the first area identifier; and
   when the first router is an area border router, querying the first router for other areas bordered by the first router, and
   importing topologies of the networks in the other areas into the network topology information database.

14. The method as recited in claim 13, further comprising:
   parsing the first link state database for a second router in the first area having a second link state database and providing Type 3, Type 4 or Type 5 announcements in the first area;
   communicating with the second router;
   when the second router is in a second area,
      querying the second link state database of the second router for second Type 1 and Type 2 link state advertisements in the second area, and
      importing the second Type 1 and Type 2 link state advertisements into the second network topology information database;
   querying the second router for a second area identifier;
   determining whether the second router is an area border router based on the second area identifier;
   determining whether the second router is an autonomous system boundary router based on the second area identifier;
   when the second router is an autonomous system boundary router, querying the second router for networks directly connected to the first router and ignoring all other Type 5 announcements in the second link state database.

15. The method as recited in claim 13, further comprising:
   parsing the first link state database for a second router in the first area having a second link state database and providing Type 3, Type 4 or Type 5 announcements in the first area;
   communicating with the second router;

when the second router is in a second area,
    querying the second link state database of the second router for second Type 1 and Type 2 link state advertisements in the second area, and
    importing the second Type 1 and Type 2 link state advertisements into the network topology information database;
querying the second router for a second area identifier;
determining whether the second router is an autonomous system boundary router based on the second area identifier; and
when the second router is an autonomous system boundary router, querying the second router for networks directly connected to the second router and ignoring all other Type 5 announcements in the second link state database.

* * * * *